(12) United States Patent  (10) Patent No.: US 9,043,840 B2
Eastes  (45) Date of Patent: May 26, 2015

(54) METHOD AND A SYSTEM FOR TELEVISION DISPLAY OF WEB FEED CONTENT

(75) Inventor: Michael D. Eastes, Greenfield, IN (US)

(73) Assignee: FeedGazer, LLC, Fishers, IN (US)

( * ) Notice: Subject to any disclaimer, the term of this patent is extended or adjusted under 35 U.S.C. 154(b) by 1510 days.

(21) Appl. No.: 12/299,471

(22) PCT Filed: May 4, 2007

(86) PCT No.: PCT/US2007/068250
§ 371 (c)(1),
(2), (4) Date: Nov. 4, 2008

(87) PCT Pub. No.: WO2007/131174
PCT Pub. Date: Nov. 15, 2007

(65) Prior Publication Data
US 2009/0138924 A1    May 28, 2009

Related U.S. Application Data

(60) Provisional application No. 60/797,770, filed on May 4, 2006.

(51) Int. Cl.
*H04N 5/445* (2011.01)
*H04N 7/173* (2011.01)
*H04N 7/16* (2011.01)
(Continued)

(52) U.S. Cl.
CPC ......... *H04N 7/163* (2013.01); *H04N 21/25891* (2013.01); *H04N 21/4622* (2013.01);
(Continued)

(58) Field of Classification Search
CPC ................ H04N 21/25891; H04N 21/4622
USPC .......................................... 725/51, 103, 109
See application file for complete search history.

(56) References Cited

U.S. PATENT DOCUMENTS

| 2003/0004880 A1 | 1/2003 | Banerjee et al. |
| 2005/0262540 A1 | 11/2005 | Swix et al. |
| 2006/0026067 A1 | 2/2006 | Nicholas et al. |

FOREIGN PATENT DOCUMENTS

| WO | 2004036897 A2 | 4/2004 |
| WO | 2006/017622 A2 | 2/2006 |

(Continued)

OTHER PUBLICATIONS

Thinking Screen Media, Inc., http://www.thinkingscreen.com/framechannel.html , Mar. 11, 2010.
(Continued)

*Primary Examiner* — James R Sheleheda
(74) *Attorney, Agent, or Firm* — Darrin Wesley Harris

(57) ABSTRACT

A system and method are described that provide television content broadcast system subscribers with convenient access to aggregated web feed content. In one embodiment, a television content broadcast system (20) maintains a database (21) linking one or more particular subscribers with one or more sources of web feed content. The television content broadcast system (20) downloads web feed content for a subscriber from the one or more sources associated with the subscriber, either at the user's request or to a cache (22). The television content broadcast system (20) sends the downloaded web feed content through a web content interface (30(2)) to a television receiver (41), or through a web content interface (30(3)) to a local memory (51) in a set-top box (50). In another embodiment, the television content broadcast subscribers also have accounts on a web content aggregation system (10). Web content aggregation system (10) retrieves web feed content associated with the user, and sends the web feed content to television content broadcast system (20) for forwarding to the appropriate subscriber.

15 Claims, 5 Drawing Sheets

(51) Int. Cl.
*H04N 21/258* (2011.01)
*H04N 21/462* (2011.01)
*G06Q 30/02* (2012.01)
*H04N 21/235* (2011.01)
*H04N 21/433* (2011.01)
*H04N 21/435* (2011.01)
*H04N 21/488* (2011.01)
*H04N 21/8545* (2011.01)
*H04L 29/08* (2006.01)

(52) U.S. Cl.
CPC ............. *G06Q30/02* (2013.01); *H04N 21/235* (2013.01); *H04N 21/2353* (2013.01); *H04N 21/4331* (2013.01); *H04N 21/435* (2013.01); *H04N 21/4886* (2013.01); *H04N 21/8545* (2013.01); *H04L 67/26* (2013.01)

(56) References Cited

FOREIGN PATENT DOCUMENTS

| WO | WO 2006017622 A2 * | 2/2006 |
|----|---------------------|--------|
| WO | 2007131174 A2       | 11/2007 |

OTHER PUBLICATIONS

Yasuhiro Yuki, Nobuhiro Kambe, Tomoaki Maruyama, Akino Inoue, Platform Development Center, Matsushita Electric Industrial Co., Ltd., An Efficient Approach for Providing Update Information Among Networked Appliances, IEEE Communications Society, 2005.

* cited by examiner

METHOD AND A SYSTEM FOR TELEVISION DISPLAY OF WEB FEED CONTENT

RELATED APPLICATION DATA

This application claims the benefit of U.S. Provisional Application Ser. No. 60/797,770 filed on May 4, 2006 and International Application No. PCT/US2007/068250 filed on May 4, 2007. The entireties of these applications are hereby incorporated by reference.

FIELD OF THE INVENTION

The present invention generally relates to web feed content aggregation systems of any web syndication type (e.g., RSS and Atom) and television content broadcast systems of any TV broadcasting type (e.g., cable and satellite). The present invention specifically relates to an interfacing between the web feed content aggregation system and the television content broadcast system to facilitate a television display of web feed content, particularly on-demand.

BACKGROUND

Web feed content is the textual/visual/aural content of any web syndication type including, but not limited to, web text content, web image content, web video content, web audio content and web animation content. A web feed content aggregation system is a system structurally configured on a user subscription account basis to retrieve syndicated web feed content (e.g., RSS, Atom and other XML formats) published by web servers.

Television content is the textual/visual/aural content of telecommunication systems including, but not limited to, TV text content, TV image content, TV video content, TV audio content and TV animation content. A television content broadcast system is a system structurally configured to receive and broadcast television content on a user subscription account basis.

SUMMARY

The present invention is a web feed content interface for facilitating an exchange of web feed content between a web feed content aggregation system and a television content broadcast system, and for facilitating an exchange of web feed content between a television content broadcast system and a television or a set top box for purposes of a television display of the web feed content, particularly on-demand.

In one form of the present invention, the web feed content aggregation system is operable to facilitate a user management of web feed content based on a web feed content aggregator subscription account of a user, and the television content broadcast system is operable to facilitate a user management of a display of television content based on a television content broadcast subscription account of the user. The web feed content interface of the present invention is established between the web feed content aggregation system, the television content broadcast system and a television to facilitate an exchange of web feed content between the web feed content aggregation system and the television content broadcast system based on an account association of the user's web feed content aggregator subscription account and the television content broadcast subscription account whereby a television display of the web feed content can be managed by the user, particularly on-demand.

DETAILED DESCRIPTION

Figure 1:
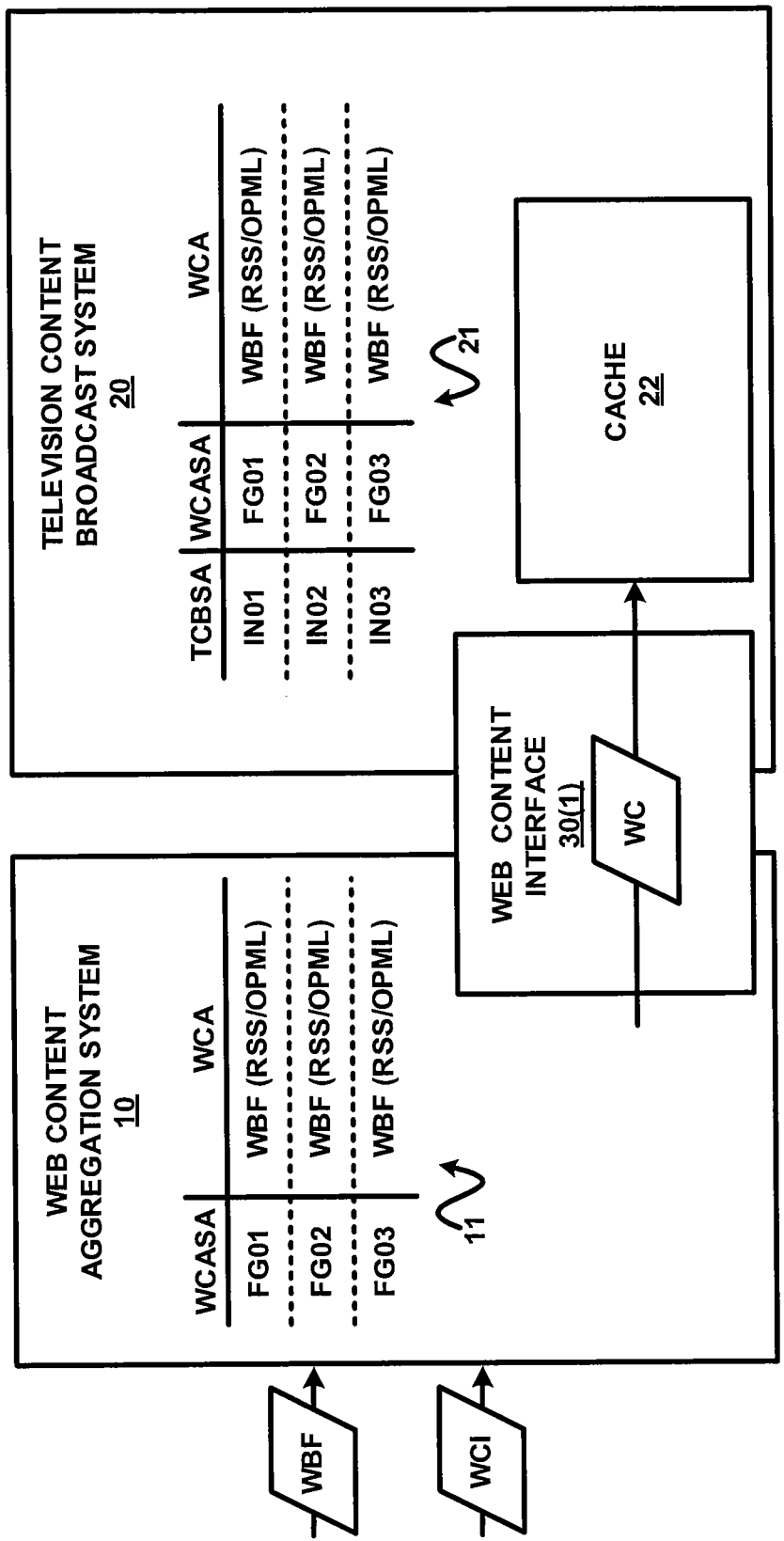
FIG. 1 illustrates one embodiment of a web feed content aggregation system, a television content broadcast system and a web feed content interface in accordance with the present invention.

FIG. 1 illustrates a web feed content aggregation system 10 structurally configured on a user subscription account basis to retrieve syndicated web feed content of any format (e.g., RSS, Atom and other XML formats) published by any type of web server. Commercial examples of web feed content aggregation system 10 include, but is not limited to, (1) www.feedgazer.com; (2) www.google.com/reader; (3) my.yahoo.com; (4) www.pluck.com; (5) www.newsgator.com; (6) www.rojo.com; (7) www.bloglines.com; (8) www.feedlounge.com; (9) www.netvibes.com; (10) www.newsfirerss.com; (11) www.rrsowl.com; (12) www.rrsexpress.net; (13) www.mozilla.com/en-US/firefox/; (14) www.rssfwd.com/; (15) www.raggle.org/; and (16) www.planetplanet.org/.

While any of the current and future web feed content aggregation systems may be employed in accordance with the inventive principles of the present invention, www.feedgazer.com is currently preferred in view of its capability to enable a user with a management of individual web feeds of any type based on a web feed content aggregation subscription account established by www.feedgazer.com on behalf of the user and to read in lists of web feeds of any type from additional web feed content aggregation subscription accounts established by third party web feed content aggregation systems on behalf of the user. As such, web feed content aggregation system 10 is shown in FIG. 1 as receiving web feed content WFC for populating a table 11 representing a web feed content aggregation WFCA of web feed content WFC on a web feed content aggregation subscription account WFCASA basis, of which web feed content aggregation subscription accounts FG01, FG02 and FG03 of www.feedgazer.com are shown. As previously described, web feed content WFC can either be directly subscribed by the user via www.feedgazer.com ("RSS") and/or indirectly subscribed by the user via one or more third party web feed content aggregation systems ("OPML").

FIG. 1 further illustrates a television content broadcast system 20 structurally configured to receive and broadcast television content on a user subscription account basis. Commercial examples of television content broadcast system 20 include, but are not limited to, cable television providers such as (1) Insight Communications; (2) Comast; (3) Adelphia; (4) Austar; (5) Bright House Networks; (6) CableOne; (7) Cable TV Hong Kong; (8) Cablevision (US); (9) Cablevision (Canada); (10) Canal Digital; (11) Charter; (12) Champion Broadband; (13) Cogeco; (14) Columbus Communications; (15) Com Hem; (16) Cox; (17) Eastlink; (18) Foxtel; (19) GCI; (20) Global Destiny; (21) Globosat; (22) Kabel Deutschland; (23) Knology; (24) MASTV; (25) MCV Broadband;

(26) Mediacom; (27) Midcontinent Communications; (28) Millennium Digital Media; (29) Neighbourhood Cable; (30) Net Brasil; (31) NTL; (32) Ono; (33) Optus; (34) Persona; (35) RCN; (36) Rogers; (37) Satview Broadband Ltd; (38) Service Electric; (39) SkyCable; (40) Shaw; (41) StarHub CableTV; (42) Suddenlink; (43) TDC; (44) Tele2; (45) TelstraClear InHomeTV; (46) Time Warner; (47) TransACT; (48) TV Cabo; (49) Vidéotron; (50) Virgin Media; (51) WOW! Internet Cable Phone; and (52) WightCable.

Further commercial examples of television content broadcast system 20 include, but are not limited to, satellite television providers such as (1) AlphaStar; (2) ART; (3) Astro; (4) Astro Nusantara; (5) Athina Sat; (6) Austar; (7) Bell ExpressVu; (8) Canal Digital; (9) CanalSat; (10) Cyfra+; (11) DialogTV; (12) Digital+; (13) Digiturk; (14) DirecTV; (15) Dish Network| Dish TV; (16) DStv; (17) Euro1080; (18) Freesat; (19) Freesat from Sky; (20) FreeView (NZ); (21) Foxtel; (22) GlobeCast World TV; (23) Globosat; (24) Glorystar; (25) Home2US; (26) NTV Plus; (27) NOVA Cyprus; (28) NOVA Greece; (29) Orbit; (30) Premiere; (31) PrimeStar; (32) SelecTV; (33) Showtime Arabia; (34) Sky Angel; (35) Sky Digital; (36) SKY Italia; (37) Sky PerfecTV!; (38) Sky TV (NZ); (39) Star Choice; (40) STAR TV; (41) Tata Sky; (42) TPS; (43) TV Cabo; (44) UBI World TV; (45) Viasat; (46) Voom; and (47) WOWOW.

While any of the current and future television content broadcast systems may be employed in accordance with the inventive principles of the present invention, such systems having an On Demand capability or the like are preferred in view of the ease and convenience a user would have in managing a television display of web feed content based on a remote control of these features as known in the art.

FIG. 1 further illustrates a web feed content interface 30(1) structurally configured to exchange web feed content WFC between web feed content aggregation system 10 and television content broadcast system 20 based on an account association of each web feed content aggregator subscription account ("WFCASA") of system 10 to a television content broadcast subscription account ("TCBSA") of system 20 as represented by a table 21, in which television content broadcast subscription accounts IN01, IN02 and IN03 of Insight Communications for example are shown associated with respective web feed content aggregator subscription accounts FG01, FG02 and FG03 of www.feedgazer.com for example.

In view of the numerous and variety of possible commercial implementations of systems 10 and 20 in practice, the present invention neither imposes any limitations nor any restrictions as to the manner by which web feed content interface 30(1) is structurally configured to exchange and format web feed content WFC between systems 10 and 20.

In one embodiment, web feed content interface 30(1) is structurally configured as a database manager of any type operable to exchange web feed content WFC between systems 10 and 20 in a format suitable for the transmission for the world wide web. Alternatively or concurrently, web feed content interface 30(1) is structurally configured as a database manager of any type operable to exchange web feed content WFC between systems 10 and 20 in a format suitable for the broadcast of the web feed content WFC in a television content format. For either embodiment, television content broadcast system 20 preferably, although not required, employs a cache 22 for storing a portion or an entirety of web feed content WFC for each individual television content broadcast subscription account TCBSA.

Figure 2:
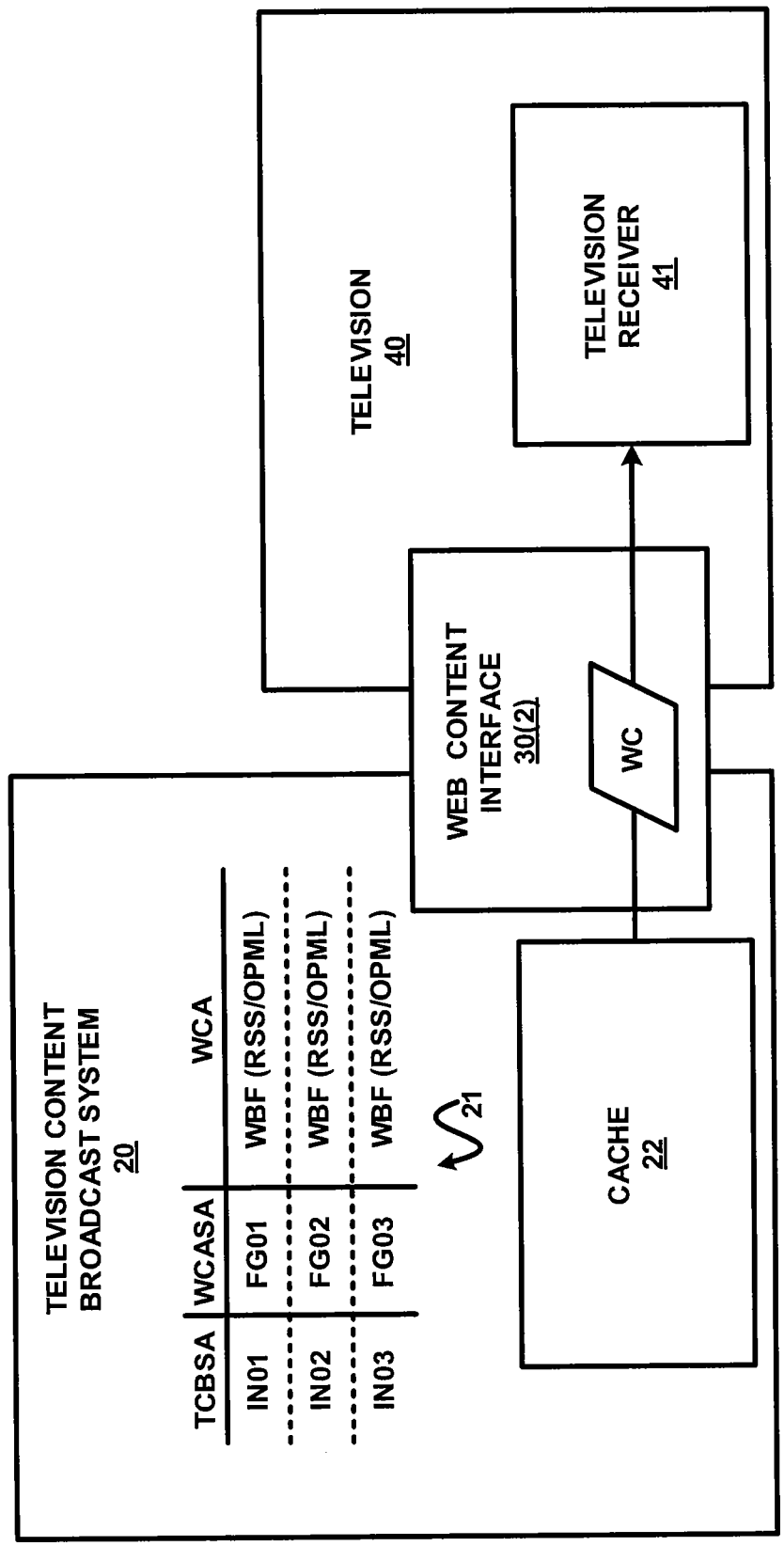
FIG. 2 illustrates one embodiment of a television content broadcast system, a television and a web feed content interface in accordance with the present invention.
Figure 3:
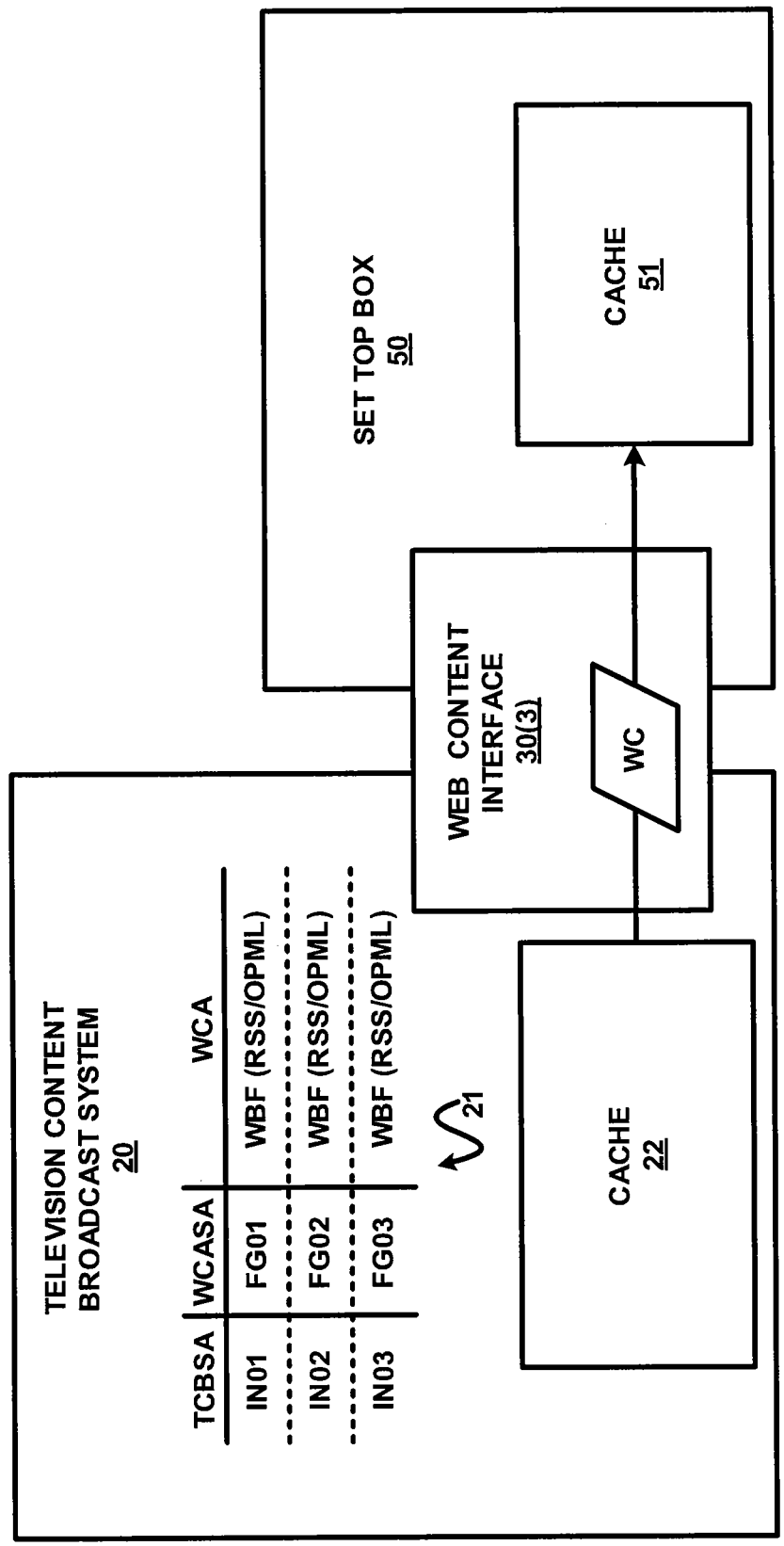
FIG. 3 illustrates one embodiment of a television content broadcast system, a set top box and a web feed content interface in accordance with the present invention.

Web feed content interface 30(1) is considered a front end interface. To further enable television display of the web feed content WFC that is managed by a user of a television content broadcast subscription account TCBSA, a back end web feed content interface 30(2) is structurally configured to exchange web feed content WFC between television content broadcast system 20 and either a television 40 via its television receiver 41 (e.g., a cable based receiver) as shown in FIG. 2 or a set top box 50 via a cache 51 as shown in FIG. 3. In either case, in view of the numerous and variety of possible commercial implementations of system 20, television 40 and set top box 50 in practice, the present invention neither imposes any limitations nor any restrictions as to the manner by which web feed content interface 30(2) is structurally configured to exchange and format web feed content WFC system 20, television 40 and set top box 50.

In one embodiment, web feed content interface 30(2) is structurally configured as a feed on demand manager operable to enable a user of the television content broadcast subscription account TCBSA to control a display of the web feed content WFC on-demand via a remote control whereby television content broadcast system 20 is responsive to remote control commands to provide the web feed content WFC on-demand in either a world wide web format and/or in a television content format to television receiver 41 or set top box 50 based on the account association.

Figure 4:
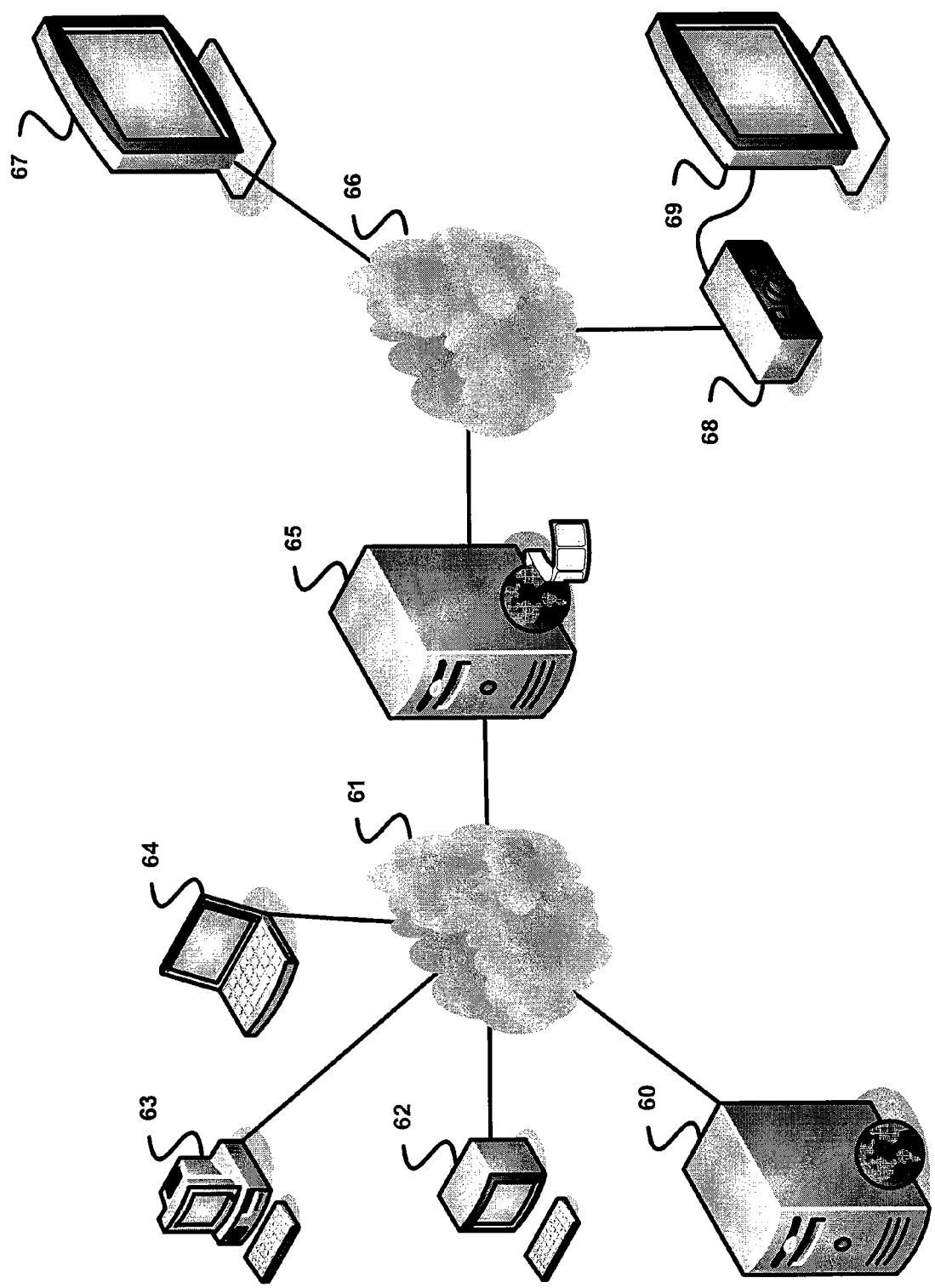
FIG. 4 illustrates a first exemplary embodiment of FIGS. 1-3.

FIG. 4 illustrates an exemplary embodiment of FIGS. 1-3 with a web server 60 serving as web feed content aggregation system 10 (FIG. 1) and a streaming/downloading media server 65 serving as a feed on demand component of television content broadcast system 20 (FIGS. 1-3). A user can utilize a PC 63, a workstation 64, a laptop 65 or the like to manage a retrieval of web feed content WFC by server 60 via an internet network 61 of any type from other web servers (not shown) based on the user's web feed content aggregation subscription account WFCASA (e.g., account FG01 of FIGS. 1-3). Front end web feed content interface 30(1) (FIG. 1) is installed in server 60, installed in server 65 or distributed among servers 60 and 65 to provide web feed content WFC retrieved by server 60 to server 65 on a web feed content aggregation subscription account basis WFCASA.

Back end web feed content interface 30(2) (FIGS. 2 and 3) is installed in server 65, installed in a television 67 and a set top box 68, or distributed among server 65, television 67 and set top box 68 to provide the web feed content WFC received by server 65 via a telecommunications network 66 of any type in either a world wide web format and/or in a television content format to television 67 or a television 69 via set top box 68 based on an account association of the user's web feed content aggregation subscription account WFCASA (e.g., account FG01 of FIGS. 1-3) and television content broadcast subscription account TCBSA (e.g., account IN01 of FIGS. 1-3).

Figure 5:
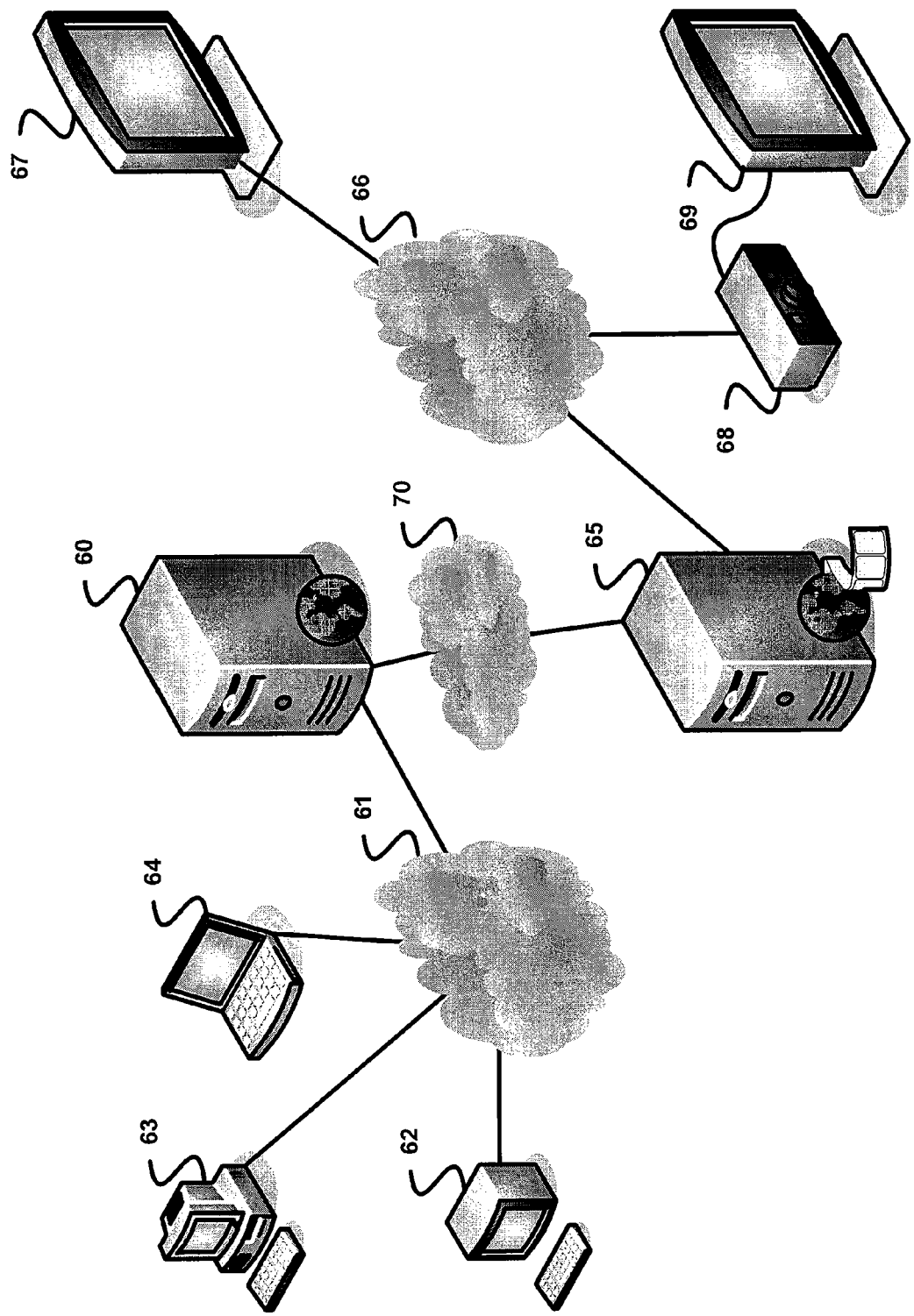
FIG. 5 illustrates a second exemplary embodiment of FIGS. 1-3.

FIG. 5. illustrates an alternative embodiment of FIG. 4 with web server 60 being connected via a intranet network 70 of any type to streaming/downloading media server 65.

Referring to FIGS. 4 and 5, servers 60 and 65 can represent an actual physical implementation of the present invention or a logical domain representation of the present invention. Furthermore, a video on demand system can be integrated in server 65 with a feed on demand system in accordance with the present invention. Commercial examples of video on demand system include, but are not limited to, Akimbo, iN Demand and SeaChange International.

Still referring to FIGS. 4 and 5, as known in the art servers 60 and 65 include processors and memories. For the purposes of the present invention, term "processor" as used herein is broadly defined as one or more processing units of any type for performing all arithmetic and logical operations and for decoding and executing all instructions related to facilitating an implementation of the present invention. Additionally, the term "memory" as used herein is broadly defined as encompassing all storage space in the form of computer readable mediums of any type.

In practice, the structural configurations of interfaces 30 are within the skill of those having ordinary skill in the art of web and television formatting and communication protocols, particularly those having skill in database management and video on demand.

While the embodiments of the invention disclosed herein are presently considered to be preferred, various changes and modifications can be made without departing from the spirit and scope of the present invention. The scope of the invention is indicated in the appended claims, and all changes that come within the meaning and range of equivalents are intended to be embraced therein.

What is claimed is:

1. A system, comprising:
   a processor; and
   a memory in communication with the processor, the memory storing programming instructions executable by the processor to:
   maintain a database that associates each of a plurality of television content subscriber accounts with at least one syndicated web content stream;
   receive a first signal identifying a particular subscriber account; and
   responsively to receiving the first signal, sending a second signal that indicates the at least one syndicated web content stream associated with the identified subscriber account.

2. The system of claim 1, wherein the at least one syndicated web content stream for at least one television content subscriber is associated in the database with an account on a web content aggregation system.

3. The system of claim 2, wherein the web content aggregation system account provides the user access to control to add an association to the database between the television subscriber account and a new syndicated web content stream.

4. The system of claim 1, wherein the programming instructions are further executable by the processor to:
   receive a subscriber-initiated trigger signal; and
   retrieve current content from at least one of the at least one syndicated web content stream associated with the identified subscriber account.

5. The system of claim 1,
   further comprising a digital signal processor; and
   wherein the second signal is interpreted by the digital signal processor to form a standard television signal.

6. The system of claim 1, wherein the programming instructions are further executable by the processor to associate one or more feeds with a single television content subscriber account by reference to a single OPML resource.

7. A system, comprising:
   a database that associates each of a plurality of television content subscriber accounts with at least one syndicated web content stream;
   a first processor in communication with the database; and
   a first memory in communication with the processor, the memory storing programming instructions executable by the processor to:
   send a request identifying a particular television content subscriber account; and
   receive a response encoding at least a portion of the content in the at least one syndicated web content stream that is associated in the database with the identified subscriber.

8. The system of claim 7,
   further comprising a second memory and a second processor; and
   wherein the second memory stores programming instructions executable by the second processor to perform one or more actions selected from the group consisting of:
   adding to the database an association between a syndicated web content stream and a television content subscriber; and
   removing from the database an association between a syndicated web content stream and a television content subscriber.

9. The system of claim 7, wherein the programming instructions stored in the first memory are further executable by the first processor to:
   responsively to a subscriber command, send a trigger signal to the database; and
   receive from the database then-current content, pulled in response to the trigger signal,
   from at least one of the at least one syndicated web content stream associated with the identified subscriber account.

10. The system of claim 9, wherein the programming instructions stored in the first memory are further executable by the first processor to convert the response into a television signal that is interpreted and displayed by a television.

11. The system of claim 7, wherein the programming instructions stored in the first memory are further executable by the first processor to:
    send a request signal to the database; and
    receive from the database content from at least one of the at least one syndicated web content streams associated with the identified subscriber account, where the content was pulled before the request arrived at the database.

12. The system of claim 11, wherein the programming instructions stored in the first memory are further executable by the first processor to convert the response into a television signal that is interpreted and displayed by a television.

13. The system of claim 11, wherein the content was pulled in response to a time-based trigger signal.

14. The system of claim 7, wherein the programming instructions stored in the first memory are further executable by the first processor to convert the response into a television signal that is interpreted and displayed by a television.

15. A method of displaying web feed content on television, the method comprising:
    operating a web feed content aggregation system for retrieving syndicated web feed content on a user subscription account basis;
    operating a television content broadcast system for broadcasting television content on a user subscription basis;
    interfacing the web feed content aggregation system and the television content broadcast system based on an account association of a web feed content aggregator subscription account and a television content broadcast subscription account; and
    facilitating a user management of a television display of the web feed content as a function of the account association of the web feed content aggregator subscription account and the television content broadcast subscription account.

* * * * *